United States Patent [19]

Faulkner et al.

[11] Patent Number: 5,318,169
[45] Date of Patent: Jun. 7, 1994

[54] SPIRAL CONVEYOR BELT

[75] Inventors: William G. Faulkner; Marie-Francoise B. Faulkner, both of 6701 Newman Dr., Oklahoma City, Okla. 73162

[73] Assignees: William G. Faulkner; Marie Francoise Bigot Faulkner, both of Oklahoma City, Okla.

[21] Appl. No.: 69,057

[22] Filed: May 27, 1993

[51] Int. Cl.$^5$ .............................................. B65G 21/18
[52] U.S. Cl. .................................... 198/778; 198/853
[58] Field of Search ................ 198/778, 850, 852, 853

[56] References Cited

U.S. PATENT DOCUMENTS

| | | | |
|---|---|---|---|
| 3,774,752 | 11/1973 | Harvey | 198/852 |
| 5,131,526 | 7/1992 | Kaak | 198/778 |
| 5,137,141 | 8/1992 | Irwin | 198/778 |
| 5,139,135 | 8/1992 | Irwin et al. | 198/778 X |
| 5,141,099 | 8/1992 | Baumgartner | 198/778 |
| 5,181,601 | 1/1993 | Palmaer et al. | 198/831 |
| 5,224,583 | 7/1993 | Palmaer et al. | 198/853 X |

Primary Examiner—James R. Bidwell
Attorney, Agent, or Firm—Dunlap, Codding & Lee

[57] ABSTRACT

A spiral conveyor belt adapted to turn on a radius. The spiral conveyor belt comprises a plurality of link assemblies with each of the link assemblies having a plurality of forward link ends and a plurality of rearward link ends. Each link assembly is positioned near one of the other link assemblies with the forward link ends on one of the link assemblies being disposed near the rearward link ends on the other link assembly. A link shaft is disposed through the forward link ends and the rearward link ends of the adjacent link assemblies for interconnecting the link assemblies to form the spiral conveyor belt. The forward link ends and the rearward link ends on each of the link assemblies near at least a first end of the link assembly are spaced a distance apart and connected by connecting members whereby the forward link ends and the rearward link ends and the connecting members connected thereto are collapsible generally toward each other or expandable generally away from each other as the spiral conveyor belt is turned on the radius. Each of the link shafts is tapered at least near the first end thereof to permit movement of the tapered portion of the link shaft in shaft openings in the forward and rearward link ends as the spiral conveyor belt is turned on a radius.

14 Claims, 3 Drawing Sheets

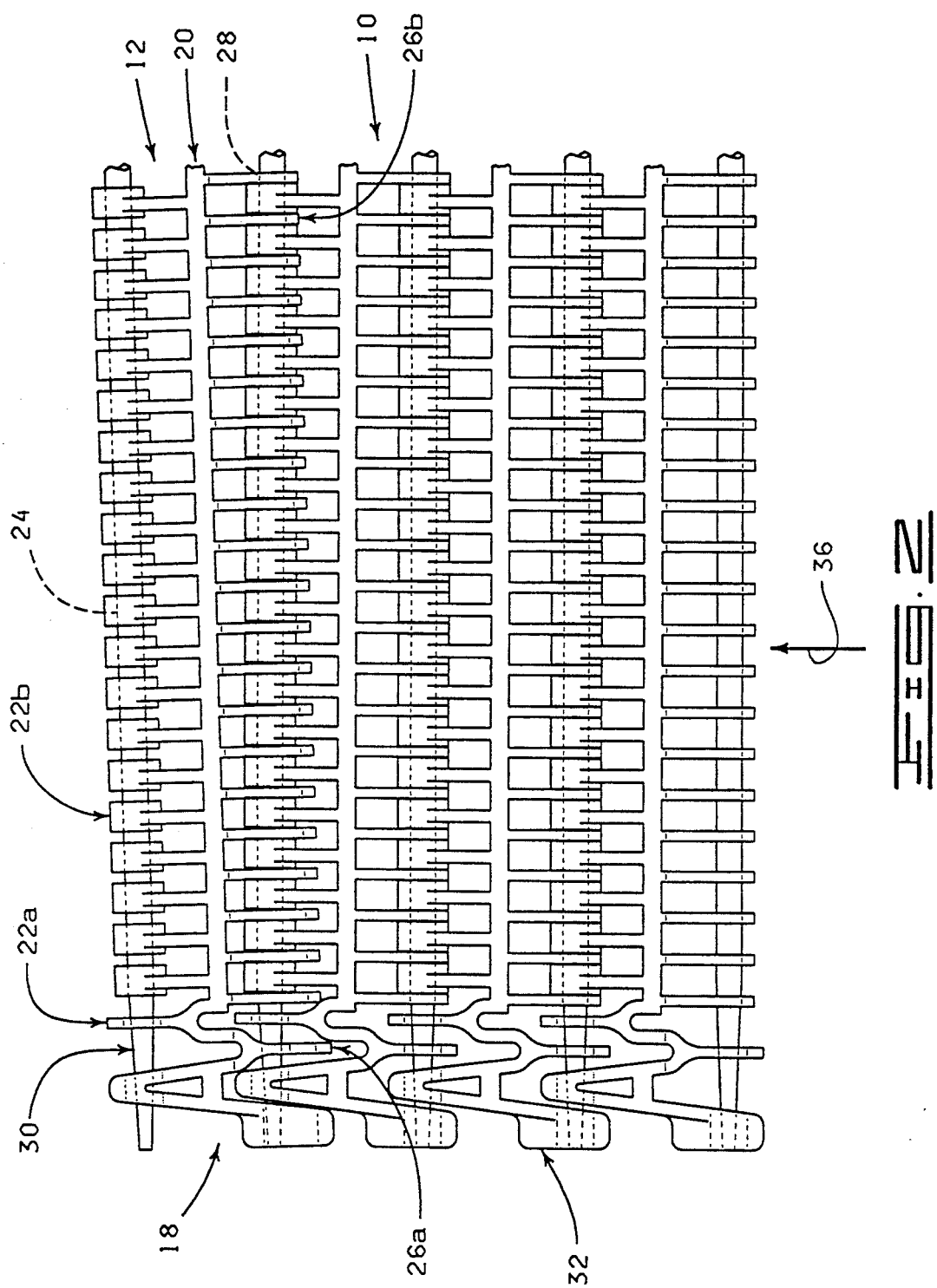

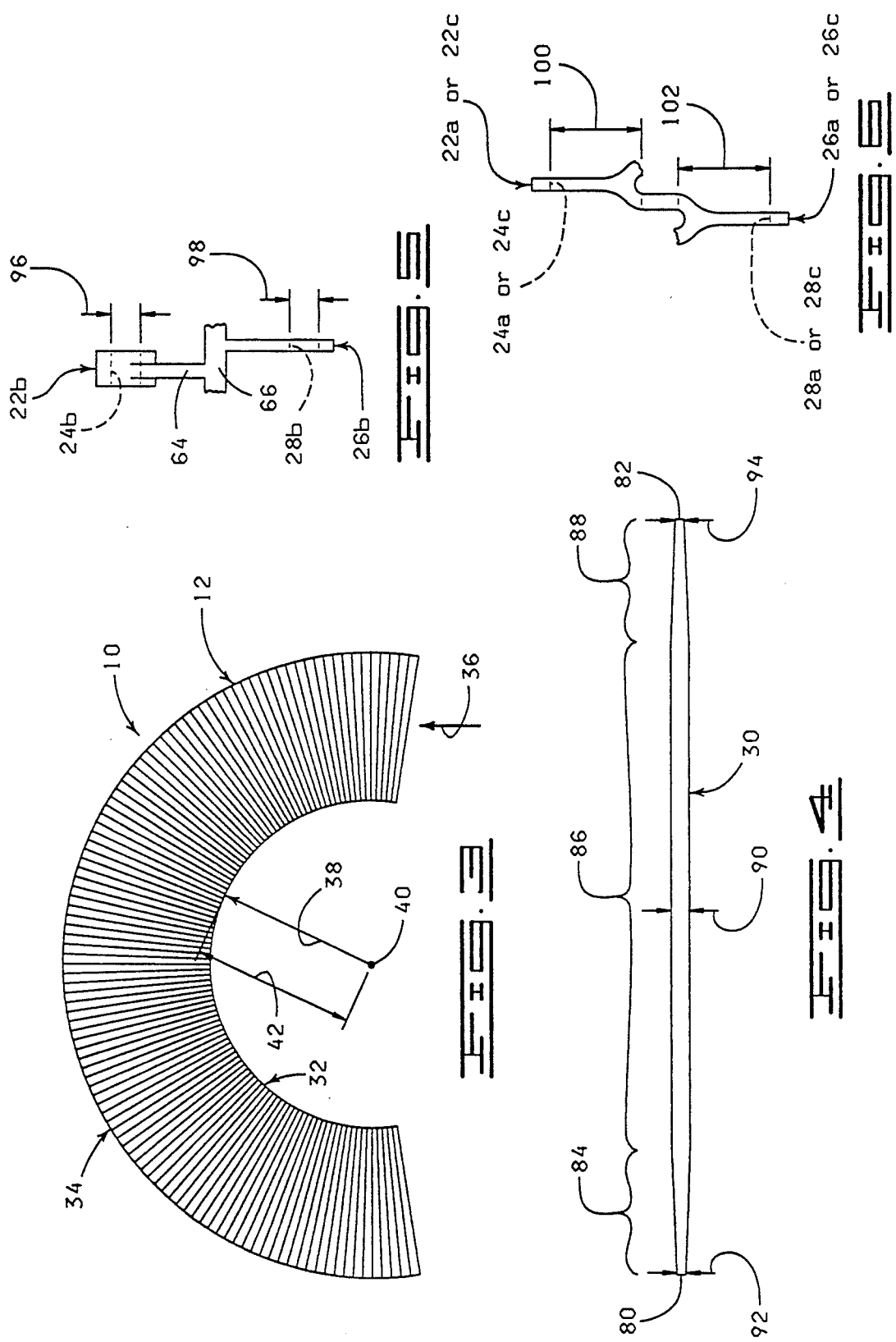

000
SPIRAL CONVEYOR BELT

FIELD OF THE INVENTION

The present invention relates generally to conveyor belts and how more particularly, but not by way of limitation, to a spiral conveyor belt adapted to be turned on a radius.

BRIEF DESCRIPTION OF THE DRAWINGS

FIG. 2 is a top plan view showing four link assemblies interconnected to form a spiral conveyor belt, the link assemblies being shown in a position where the spiral conveyor belt is starting to turn on the radius.

FIG. 3 is a diagrammatic view showing a plurality of link assemblies in diagrammatic line form as the spiral conveyor belt is turned on a radius.

FIG. 4 is an elevational view of a typical link shaft.

FIG. 5 is a plan view of a typical forward link end and rearward link end in the second section of each of the link assemblies.

FIG. 6 is a plan view of a typical forward link end and rearward link end in a first or third section of the link assemblies.

DESCRIPTION OF THE PREFERRED EMBODIMENTS

Figure 1:
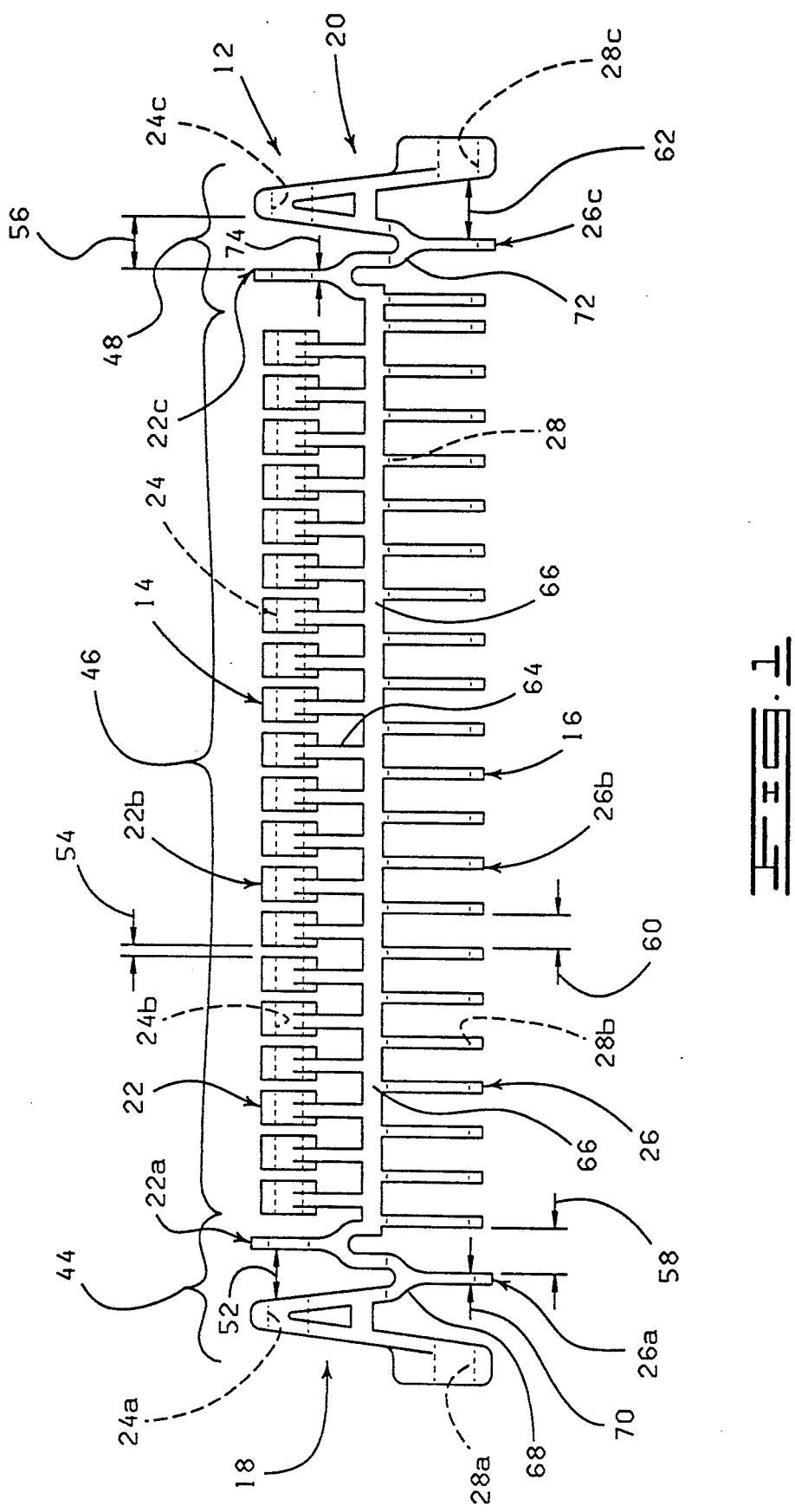
FIG. 1 is a top plan view showing a typical link assembly.

There are many instances when it is necessary for a conveyor belt to be turned on a radius for various reasons such as merely changing the direction of travel. Various problems occur when turning a conveyor belt on a radius which limit the radius on which a given conveyor belt can be turned. One problem for example with prior conveyor belts has been that most of the load imposed on the link shafts has been imposed on the link shafts near the outer edge of the conveyor as the conveyor belt is turned on the radius. This can result in the link shafts breaking or damage to the link assemblies. To permit conveyor belts to be turned on a radius, the holes in the link assemblies where the link shafts extend through have been elongated or enlarged to accommodate the compression or expansion of the link assemblies as the conveyor belt is turned on the radius. There is a limit of course to how large a hole can be made or elongated to accommodate this expansion or compression of the link assemblies. The present spiral conveyor is designed and constructed to permit a given size of conveyor to turn on a smaller radius as compared to prior art spiral type conveyors, and to distribute most of the load on a mid section of the conveyor belt as the conveyor belt is being turned.

The present invention comprises a spiral conveyor 10 (partially shown in FIG. 2 and partially and diagrammatically shown in FIG. 3) which is adapted to turn on a radius. The spiral conveyor 10 comprises a plurality of link assemblies 12. Each of the link assemblies 12 preferably is constructed of a plastic or ceramic material, although they could be constructed of metal. A typical link assembly 12 is shown in FIG. 1 and four link assemblies 12 are shown in FIG. 2 interconnected to form a portion of the spiral conveyor 10 and the link assemblies 12 are diagrammatically shown in FIG. 3 as straight lines with each link assembly being represented in FIG. 3 by two straight lines spaced a distance apart and disposed about adjacent each other.

Each link assembly 12 includes a forward end 14 (FIG. 1), a rearward end 16 (FIG. 1), a first side 18 (FIG. 1) and a second side 20 (FIG. 1).

A plurality of forward link ends 22 (FIGS. 1 and 2) are formed on the forward end 14 of each link assembly 12. The forward link ends 22 on each link assembly 12 are spaced a distance apart and spaced along the forward end 14 of the link assembly 12. A forward shaft opening 24 (shown in FIGS. 1 and 2 in dashed lines) is formed through each of the forward link ends 22. The forward shaft openings 24 are generally aligned.

A plurality of rearward link ends 26 (FIGS. 1 and 2) are formed on the rearward end 16 of each of the link assemblies 12. The rearward link ends 26 on each of the link assemblies 12 are spaced a distance apart and spaced along the rearward end 16 of each link assembly 12. A rearward shaft opening 28 (shown in dashed lines in FIGS. 1 and 2) is formed through each of the rearward link ends 26. The rearward shaft openings 28 are generally aligned.

The forward end 14 of each link assembly 12 is disposed near the rearward end 16 of one of the other link assemblies 12 and positioned so that the forward link ends 22 on each of the link assemblies 12 are positioned between the rearward link ends 26 on one of the other link assemblies 12 with the forward shaft opening 24 being aligned with the rearward shaft openings 28. More particularly, each of the forward link ends 22 on each of the link assemblies 12 is disposed between two adjacent rearward link ends 26 on one of the other link assemblies 12 with the forward shaft openings 24 and the rearward shaft openings 28 being aligned.

The spiral conveyor 10 includes a plurality of link shafts 30 (only one of the link shafts 30 being designated with a reference numeral in FIG. 2). Each of the link shafts 30 is disposed through the aligned forward shaft openings 24 and rearward shaft openings 28 to interconnect each of the link assemblies 12 with one of the other link assemblies 12 to form the spiral conveyor belt 10.

The link assemblies 12 are connected to form the spiral conveyor belt 10 with a first side 32 (FIG. 3) and a second side 34 (FIG. 3). The spiral conveyor belt 10 may travel in a forward direction 36 (FIGS. 2 and 3) and is constructed to be turned on a radius 38 (FIG. 3) to the forward direction 36 of travel extending at an angle with respect to the forward direction 36 of travel.

As shown in FIG. 3, the spiral conveyor belt 10 is turned on the radius 38 through an angle of about one hundred eighty degrees. It should be noted that the spiral conveyor belt 10 may be turned on the radius 38 through any desired angle and the spiral conveyor belt 10 is shown in FIG. 3 as being turned through an angle of one hundred eighty degrees merely for illustrative purposes only. The radius 38 extends from a point 40 (FIG. 3) which is spaced a distance 42 (FIG. 3) from the first side 32 of the spiral conveyor belt 10.

Each of the link assemblies 12 is divided into a first section 44 (FIG. 1), a second section 46 (FIG. 1) and a third section 48 (FIG. 1). The first section 44 extends from about the first side 18 of the link assembly 12 a distance toward the second side 20 of the link assembly 12. The second section 46 extends from about the first section 44 a distance toward the second side 20 of the link assembly 12. The third section 48 extends from about the second section 46 to about the second side 20 of the link assembly 12. As shown in FIGS. 1 and 2, each of the link assemblies 12 is an integrally formed link assembly 12 constructed of a plastic or ceramic material and the sections 44, 46 and 48 are integrally constructed and connected. In some embodiments, the second section 46 may comprise multiple intermediate portions of the link assembly interconnected by the link shafts 30 to form the continuous link assembly 12. Alternately or in addition, the first and the third sections 44 and 48 may comprise separate elements interconnected with the second section 46 by the link shafts 30 to form the continuous link assembly 12. It also should be noted that, in some embodiments, the second section 46 may be constructed in a different manner as compared to the first and the third sections 44 and 46. For example, the second section 46 might comprise a solid flat top type of conveying element while the first and the third sections 44 and 48 comprise the link ends interconnected by the connecting members as illustrated in FIGS. 1 and 2 and as will be described in greater detail below.

The forward link ends 22 in the first section 44 are designated in FIGS. 1 and 2 with the reference numeral 22a, the forward link ends 22 in the second section 46 are designated in FIGS. 1 and 2 by the reference numeral 22b and the forward link ends 22 in the third section 48 are designated in FIGS. 1 and 2 by the reference numeral 22c in FIGS. 1 and 2.

The rearward link ends 26 are formed on the rearward end 16 of the link assemblies 12 as described before. The rearward link ends 26 in the first section 44 are designated in FIGS. 1 and 2 with the reference numeral 26a, the rearward link ends 26 in the second section 46 are designated in FIGS. 1 and 2 by the reference numeral 26b and the rearward link ends 26 in the third section 48 are designated by the reference numeral 26c in FIGS. 1 and 2.

The forward link ends 22a in the first section 44 are spaced apart a first distance 52 (FIG. 1). The forward link ends 22b in the second section 46 are spaced apart a second distance 54 (FIG. 1). The forward link ends 26c in the third section are spaced apart a third distance 56 (FIG. 1).

The rearward link ends 26a in the first section 44 are spaced apart a first distance 58 (FIG. 1). The rearward link ends 26b in the second section 46 are spaced apart a second distance 60 (FIG. 1). The rearward link ends 26c in the third section 48 are spaced apart a third distance 62 (FIG. 1).

In a preferred embodiment, the second distance 54 is slightly greater than the thickness of the rearward link ends 26b so that each of the rearward link ends 26b may be disposed in the space formed by the distance 54 between two of the forward link ends 22b. The first and the third distances 52 and 56 and the first and the third distances 58 and 62 each are sized to cooperate with the connecting members (described below) to permit the required compression and expansion between the forward link ends 22a and 22c and the rearward link ends 26a and 26c as the spiral conveyor belt 10 is turned on the radius 38.

It should be noted that the distances 52, 54, 56, 58, 60 and 62 all could be equal or all could be different in various embodiments of the present invention as desired in a particular application. The distances 54 and 60 are not critical with respect to the present invention and it only is necessary that the distance 54 be sized with respect to the thickness of the rearward link ends 26b so that the rearward link ends 26b can be positioned between pairs of forward link ends 22b as described before, the distance 60 being sized to accommodate at least one of the forward link ends 22b.

The forward link ends 22b in the first section 44 are connected to the rearward link ends 26b in the second section 46 by way of connecting members 64 (FIG. 1). The connecting members 64 are interconnected by a cross member 66 (FIG. 1). The connecting members 64 interconnecting each forward link end 22b with a corresponding rearward link end 26b are offset at about a mid point forming a squared Z-shape with adjacent pairs of the connecting members 64 forming a somewhat offset H-shape. It should be noted that in lieu of the connecting members 64 and the cross members 66 interconnecting the forward link ends 22b with the rearward link ends 26b, a solid structure could be substituted forming a flat top conveying system or some other configuration if desired in a particular application.

The forward link ends 22a in the first section 44 are interconnected by way of connecting members 68 (FIG. 1). Each of the connecting members 68 extends about angularly from one of the forward link ends 22a to the interconnected corresponding rearward link end 26a. The connecting members 68 cooperate such that the connecting members 68 connecting one link end 22a with two link ends 26a forms a somewhat Y-shape.

The connecting members 68 each have a generally rectangularly shaped cross section. Each of the connecting members 68 has a thickness 70 (FIG. 1). The thickness 70 is sized to be as thin as practical for reasons which will be made more apparent below.

The forward link ends 22c in the third section 48 are interconnected by way of connecting members 72 (FIG. 1). Each of the connecting members 72 extends about angularly from one of the forward link ends 22c to the interconnected corresponding rearward link end 26c. The connecting members 72 cooperate such that the connecting members 68 connecting one of the link ends 22c with two of the link ends 26c forms a somewhat Y-shape.

The connecting members 72 each have a generally rectangularly shaped cross section. Each of the connecting members 72 has a thickness 74 (FIG. 1). The thickness 70 is sized to be as thin as practical for reasons which will be made more apparent below.

In a preferred embodiment, the connecting members 68 and 72 are virtually identical in shape and have identical thicknesses 70 and 74. By the same token, the first and the third distances 52 and 56 are about equal and the first and the third distances 58 and 62 are about equal. In short, the first and the third sections in one preferred embodiment are identical in construction which will permit the spiral conveyor belt 10 to be turned on a radius in either direction as will be made more apparent below. Alternately, the first and the third sections 44 and 48 may be constructed different to permit the spiral conveyor belt 10 to be turned on one radius in one direction and a different radius in an opposite direction. Further, the third section 48 could be eliminated if desired in a particular application, although in this instance the spiral conveyor belt 10 would be adapted to turn in only one direction.

Shown in FIG. 4 is a typical link shaft 30. Each link shaft 30 has a first end 80 and a second end 82. A portion of the link shaft 30 near the first end 80 thereof is tapered inwardly toward the first end 80 forming a tapered first section 84 of the link shaft 80. A mid section of the link shaft 30 forms a non-tapered second section 86 of the link shaft 30. A portion of the link shaft 30 near the second end 82 is tapered toward the second end 82 forming a tapered third section 88 of the link shaft 30.

The tapered first section 84 extends from the first end 80 a distance toward the second end 82. The non-tapered second section 86 extends a distance from the tapered first section 84 toward the second end 82. The tapered third section 88 extends from the non tapered second section 86 to about the second end 82.

The link shaft 30 has a diameter 90 in the non-tapered second section 86. The link shaft 30 is tapered in the tapered first section 84 to a diameter 92 at the first end 80. The link shaft 30 is tapered in the tapered third section 88 to a diameter 94 at the second end 82. The diameters 92 and 94 are about equal and the diameters 92 and 94 each are smaller than the diameter 90.

When the link shafts 30 are positioned through the aligned forward shaft openings 24 and rearward shaft openings 28, the link shafts 30 are sized so that the first end 80 of each of the link shafts 30 is disposed near the first side 18 of the link assemblies 12 and the second end 82 of the link shafts 30 is disposed near the second side 20 of the link assemblies 12. Further, each of the link shafts 30 is sized so that the tapered first section 84 of each of the link shafts 30 extends through the first section 44 of the link assemblies 12, the non-tapered second section 86 of the link shafts 30 extends through the second sections 46 of the link assemblies 12 and the tapered third section 88 of each of the link shafts 30 extends through the third sections 48 of the link assemblies 12. In other words, the length of the tapered first section 84 is about equal to the length of the first section 44, the length of the non-tapered second section 86 is about equal to the length of the second section 46, and the length of the tapered third section 88 is about equal to the length of the third section 44.

The forward shaft openings 24b in the second sections 46 each have a diameter 96 (FIG. 5) which is slightly larger than the diameter 90 of the link shafts 30 throughout the non-tapered second sections 86. Further, the rearward shaft openings 28b in the second sections 46 each have a diameter 98 (FIG. 5) which is slightly larger than the diameter 96. It should be noted that the forward shaft openings 24b and the rearward shaft openings 28b may be oblong or formed on a radius so that the link shaft rolls in the forward and the rearward shaft openings 24b and 28b in a manner described in U.S. Pat. No. 4,972,942, titled CONVEYOR BELT, issued Nov. 27, 1990, which disclosure hereby is incorporated herein by reference.

The forward shaft openings 24a or 24c in the first and third sections 44 and 48 each are oblong shaped and have a length 100 (FIG. 6) and the length 100 is greater than the diameters 90, 92 or 94 of the link shafts 80 to permit movement of the first or third sections 84 and 88 of the link shafts 30 in the forward shaft openings 24a and 24c, respectively. The rearward shaft openings 28a or 28c in the first and third sections 44 and 48 each are oblong shaped and have a length 102 (FIG. 6) and the length 102 is greater than the diameters 90, 92 or 94 of the link shafts 80 to permit movement of the first or third sections 84 and 88 of the link shafts 30 in the rearward shaft openings 28a or 28c, respectively. The lengths 100 and 102 are about equal and each of the lengths 100 and 102 is larger than the diameter 92 or 94 of the link shafts 30.

When the spiral conveyor belt 10 or a portion thereof is moving in the forward direction 36, the non-tapered second sections 86 of the link shafts 30 engage the adjacent portions of the forward and rearward link ends 22b and 22c and carry substantially all of the load transmitted throughout the spiral conveyor belt 10. In this instance, virtually none of the load is carried by the tapered first and third sections 84 and 88 of the link shafts 30.

When the spiral conveyor belt 10 is turned on the radius 38, the forward link ends 22a are compressed as illustrated in FIG. 2 thereby causing the distances 52 to be decreased and causing the forward link ends 22a to be moved in directions generally toward each other. Further, as the spiral conveyor belt 10 is turned on the radius 38, the rearward link ends 26a are expanded thereby increasing the distances 58 and moving the rearward link ends 26a in directions generally away from each other. The collapsing and expanding of the forward and rearward link ends 22a and 26b permits the spiral conveyor belt 10 to be turned on the radius 38. The collapsing and expanding of the forward link ends 22a and 26a is permitted by the Y-shaped connecting members 68 interconnecting the forward link ends 22a with the rearward link ends 26a. The thicknesses 70 of the connecting members 68 in the first section 44 are sized to be as small as possible to permit the maximum collapsibility and expandibility of the connecting members 64 and the corresponding forward link ends 22 and 26a thereby permitting the spiral conveyor belt 10 to be turned on the radius 38 as small as possible.

The tapered first section 84 of the link shafts 30 cooperates with the elongated forward and rearward shaft openings 24a and 28a to permit the tapered first section 84 of the link shafts 30 to move the maximum distance within the forward shaft openings 24a and the rearward shaft openings 28a as the spiral conveyor belt 10 is turned on the radius 38 thereby minimizing the radius 38 upon which the spiral conveyor belt 10 may be turned.

Further, the tapered third section 88 of the link shafts 30 cooperates with the elongated forward and rearward shaft openings 24c and 28c in the third sections 48 of the link assemblies 12 so that the tapered third sections 88 of the link shafts 30 do not in substantially engage the adjacent portions of the forward link ends 22c and the rearward link ends 26c as the spiral conveyor belt 10 is turned on the radius 38. Thus, as the spiral conveyor belt 10 is turned on the radius 38, the load substantially is carried by the non-tapered second sections 86 of the link shafts 30 thereby reducing the load to be carried by the tapered third sections 88 of the link shafts 30 of the spiral conveyor belt 10 is turned on the radius 38.

If the spiral conveyor belt 10 is turned on a radius in a direction opposite to that just described, the forward and rearward link ends 22c and 26c are expanded and compressed in a manner like that described before with respect to the forward and rearward link ends 24a and 26a.

It should be noted that the link shafts 30 each could be separated into three or more segments rather than a single integrally formed link shaft 30 as shown in FIG. 4. If the link shaft 30 is separate into three or more segments, preferably the link shafts 30 would be oriented in the spiral conveyor belt 10 so that the separations between the segments of one link shaft 30 are staggered with respect to the separations between the segments of an adjacent link shaft 30 for reinforcement purposes.

It is significant to note that the connecting members 68 and 72 are not interconnected with a cross member to permit the compression and expansion of the link ends 22a or 22c and 26a or 26c in the manner described before.

The link shafts 30 may be retained in place in a number of different ways. In one embodiment, a retainer is formed on the link shaft 30 shaped so that the link shaft 30 is forced through the appropriate openings and the retainer locks the link shafts 30 in place.

By forming the link assemblies with different ends the conveyor belt can be formed into the spiral belt described herein where the ends permit movement of one end relative to an adjacent end when the conveyor belt is turned, or the ends can be formed to form the conveyor belt to be driven in a straight line with no turningability.

In one embodiment, the cross member extends between the upper and lower surfaces of the link assemblies, and a product would be conveyed on either one of the surfaces and the belt normally would be driven from the other surface. Preferably, the cross member extends from the upper surface a distance and is spaced a distance from the lower surface. In this manner, the belt can be driven from either the upper surface or the lower surface and the spacing permits a comb transfer member to be used with the belt if desired, and it also permits the belt to be interconnected in the form of a twisted circle.

Changes may be made in the construction and the operation of the various components, elements and assemblies described herein without departing from the spirit and scope of the invention as defined in the following claims.

What is claimed is:

1. A spiral conveyor belt adapted to turn on a radius where the spiral conveyor belt has a first side and a second side and the radius is defined as a distance extending from a point spaced a distance from the first side of the spiral conveyor belt to the first side of the spiral conveyor belt, the spiral conveyor belt comprising:

a plurality of link assemblies, each link assembly being constructed of a plastic or ceramic material and having a forward end, a rearward end, a first side and a second side, a plurality of forward link ends being formed on the forward ends of each of the link assemblies with the forward link ends of each link assembly being spaced along the forward end of the link assembly, a forward shaft opening being formed through the forward link ends, a plurality of rearward link ends being formed on the rearward end of each link assembly with the rearward link ends of each link assembly being spaced along the rearward end of the link assembly, a rearward shaft opening being formed through the rearward link ends on each of the link assemblies, the forward end of each link assembly being disposed near the rearward end of another link assembly with the forward shaft openings on each link assembly being aligned with the rearward shaft openings on one of the other link assemblies, the first side of each of the link assemblies cooperating with the first sides of the other link assemblies to form the first side of the spiral conveyor belt and the second side of each of the link assemblies cooperating with the second sides of the other link assemblies to form the second side of the spiral conveyor belt, each link assembly being divided into at least two sections comprising a first section extending from the first side of the link assembly a distance toward the second side of the link assembly, and a second section extending a distance from the first section toward the second side of the link assembly, the forward link ends in the first section being spaced a distance apart and the rearward link ends in the first section being spaced a distance apart, and the forward link ends in the first section being connected to the rearward link ends in the first section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius; and a plurality of link shafts, each link shaft having a first and a second end, each link shaft having a tapered first section extending a distance from the first end of the link shaft toward the second end of the link shaft and a non-tapered second section extending from the tapered first section a distance toward the second end of the link shaft, the non-tapered second section having a diameter and the tapered first section being tapered to a diameter at the first end of the link shaft which is smaller than the diameter of the non-tapered second section, the forward shaft openings and the rearward shaft openings in each of the link assemblies in the first section being sized to permit the tapered first section of the link shafts to be moved in the forward and rearward shaft openings in the first section of each of the link assemblies as the spiral conveyor belt is moved on the radius.

2. The spiral conveyor belt of claim 1 wherein each of the link assemblies is defined further to include a third section extending a distance from the second section to about the second end of each of the link assemblies, the forward link ends in the third section being spaced a distance apart, and the forward link ends in the third section being connected to the rearward link ends in the third section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius, and wherein the link shafts each are defined further to comprise a tapered third section extending a distance from the non-tapered second section to about the second end of the link shafts, the tapered third section being tapered to a diameter at the second end of the link shaft which is smaller than the diameter of the non-tapered second section, the forward shaft openings and the rearward shaft openings in the third section of each of the link assemblies being elongated and having a length which is greater than the diameter of the tapered third section of the link shafts at the second end thereof to permit the tapered third section of the link shafts to be moved in the forward and rearward shaft openings in the third section of each of the link assemblies as the spiral conveyor belt is moved on the radius.

3. The spiral conveyor belt of claim 2 wherein the connecting members connecting two of the forward link ends in the first section of each of the link assemblies to one of the rearward link ends in the link assembly are defined further as forming a Y-shape, and wherein the connecting members connecting two of the forward link ends in the third section of each of the link assemblies to one of the rearward link ends in the link assembly are defined further as forming a Y-shape.

4. The spiral conveyor belt of claim 2 wherein the connecting members connecting two of the forward link ends in the first section of each of the link assemblies to one of the rearward link ends in the link assembly are defined further as forming a Y-shape with no cross members interconnecting the connecting members, and wherein the connecting members connecting two of the forward link ends in the third section of each of the link assemblies to one of the rearward link ends in the link assembly are defined further as forming a Y-shape with no cross members interconnecting the connecting members.

5. The spiral conveyor belt of claim 1 wherein the connecting members connecting two of the forward link ends in the first section of each of the link assemblies to one of the rearward link ends in the link assembly are defined further as forming a Y-shape.

6. The spiral conveyor belt of claim 1 wherein the connecting members connecting two of the forward link ends in the first section of each of the link assemblies to one of the rearward link ends in the link assembly are defined further as forming a Y-shape, with no cross members interconnecting the connecting members.

7. A spiral conveyor belt adapted to turn on a radius where the spiral conveyor belt has a first side and a second side and the radius is defined as a distance extending from a point spaced a distance from the first side of the spiral conveyor belt to the first side of the spiral conveyor belt, the spiral conveyor belt comprising:

a plurality of link assemblies, each link assembly being constructed of a plastic or ceramic material and having a forward end, a rearward end, a first side and a second side, a plurality of forward link ends being formed on the forward ends of each of the link assemblies with the forward link ends of each link assembly being spaced along the forward end of the link assembly, a forward shaft opening being formed through the forward link ends, a plurality of rearward link ends being formed on the rearward end of each link assembly with the rearward link ends of each link assembly being spaced along the rearward end of the link assembly, a rearward shaft opening being formed through the rearward link ends on each of the link assemblies, the forward end of each link assembly being disposed near the rearward end of another link assembly with the forward shaft openings on each link assembly being aligned with the rearward shaft openings on one of the other link assemblies, the first side of each of the link assemblies cooperating with the first sides of the other link assemblies to form the first side of the spiral conveyor belt and the second side of each of the link assemblies cooperating with the second sides of the other link assemblies to form the second side of the spiral conveyor belt, each link assembly being divided into at least two sections comprising a first section extending from the first side of the link assembly a distance toward the second side of the link assembly, and a second section extending a distance from the first section toward the second side of the link assembly, the forward link ends in the first section being spaced a distance apart and the rearward link ends in the first section being spaced a distance apart, and the forward link ends in the first section being connected to the rearward link ends in the first section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius, each of the link assemblies having a third section extending a distance from the second section to about the second end of each of the link assemblies, the forward link ends in the third section being spaced a distance apart, and the forward link ends in the third section being connected to the rearward link ends in the third section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius; and a plurality of link shafts, each link shaft having a first and a second end, each link shaft having a tapered first section extending a distance from the first end of the link shaft toward the second end of the link shaft and a non-tapered second section extending from the tapered first section a distance toward the second end of the link shaft, the non-tapered second section having a diameter and the tapered first section being tapered to a diameter at the first end of the link shaft which is smaller than the diameter of the non-tapered second section, the forward shaft openings and the rearward shaft openings in each of the link assemblies in the first section being sized to permit the tapered first section of the link shafts to be moved in the forward and rearward shaft openings in the first section of each of the link assemblies as the spiral conveyor belt is moved on the radius, each link shaft having a tapered third section extending a distance from the non-tapered second section to about the second end of the link shafts, the tapered third section being tapered to a diameter at the second end of the link shaft which is smaller than the diameter of the non-tapered second section, the forward shaft openings and the rearward shaft openings in the third section of each of the link assemblies being sized to permit the tapered third section of the link shafts to be moved in the forward and rearward shaft openings in the third section of each of the link assemblies as the spiral conveyor belt is moved on the radius; and wherein the connecting members connecting two of the forward link ends in the first section of each of the link assemblies to one of the rearward link ends in the link assembly form a Y-shape with no cross members interconnecting the connecting members, and wherein the connecting members connecting two of the forward link ends in the third section of each of the link assemblies to one of the rearward link ends in the link assembly form a Y-shape with no cross members interconnecting the connecting members.

8. A spiral conveyor belt adapted to turn on a radius where the spiral conveyor belt has a first side and a second side and the radius is defined as a distance extending from a point spaced a distance from the first side of the spiral conveyor belt to the first side of the spiral conveyor belt, the spiral conveyor belt comprising:

a plurality of link assemblies, each link assembly having a forward end, a rearward end, a first side and a second side, a plurality of forward link ends being formed on the forward ends of each of the link assemblies with the forward link ends of each link assembly being spaced along the forward end of the link assembly, a forward shaft opening being formed through the forward link ends, a plurality of rearward link end being formed on the rearward end of each link assembly with the rearward link ends of each link assembly being spaced along the rearward end of the link assembly, a rearward shaft opening being formed through the rearward link ends on each of the link assemblies, the forward end of each link assembly being disposed near the rearward end of another link assembly with the forward shaft openings on each link assembly being aligned with the rearward shaft openings on one of the other link assemblies, the first side of each of the link assemblies cooperating with the first sides of the other link assemblies to form the first side of the spiral conveyor belt and the second side of each of the link assemblies cooperating with the second sides of the other link assemblies to form the second side of the spiral conveyor belt, each link assembly being divided into at least two sections comprising a first section extending from the first side of the link assembly a distance toward the second side of the link assembly, and a second section extending a distance from the first section toward the second side of the link assembly, the forward link ends in the first section being spaced a distance apart and the rearward link ends in the first section being spaced a distance apart, and the forward link ends in the first section being connected to the rearward link ends in the first section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius; and a plurality of link shafts, each link shaft having a first and a second end, each link shaft having a tapered first section extending a distance from the first end of the link shaft toward the second end of the link shaft and a non-tapered second section extending from the tapered first section a distance toward the second end of the link shaft, the non-tapered second section having a diameter and the tapered first section being tapered to a diameter at the first end of the link shaft which is smaller than the diameter of the non-tapered second section, the forward shaft openings and the rearward shaft openings in each of the link assemblies in the first section being sized to permit the tapered first section of the link shafts to be moved in the forward and rearward shaft openings in the first section of each of the link assemblies as the spiral conveyor belt is moved on the radius.

9. The spiral conveyor belt of claim 8 wherein each of the link assemblies is defined further to include a third section extending a distance from the second section to about the second end of each of the link assemblies, the forward link ends in the third section being spaced a distance apart, and the forward link ends in the third section being connected to the rearward link ends in the third section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius, and wherein the link shafts each are defined further to comprise a tapered third section extending a distance from the non-tapered second section to about the second end of the link shafts, the tapered third section being tapered to a diameter at the second end of the link shaft which is smaller than the diameter of the non-tapered second section, the forward shaft openings and the rearward shaft openings in the third section of each of the link assemblies being elongated and having a length which is greater than the diameter of the tapered third section of the link shafts at the second end thereof to permit the tapered third section of the link shafts to be moved in the forward and rearward shaft openings in the third section of each of the link assemblies as the spiral conveyor belt is moved on the radius.

10. The spiral conveyor belt of claim 9 wherein the connecting members connecting two of the forward link ends in the first section of each of the link assemblies to one of the rearward link ends in the link assembly are defined further as forming a Y-shape, and wherein the connecting members connecting two of the forward link ends in the third section of each of the link assemblies to one of the rearward link ends in the link assembly are defined further as forming a Y-shape.

11. The spiral conveyor belt of claim 9 wherein the connecting members connecting two of the forward link ends in the first section of each of the link assemblies to one of the rearward link ends in the link assembly are defined further as forming a Y-shape with no cross members interconnecting the connecting members, and wherein the connecting members connecting two of the forward link ends in the third section of each of the link assemblies to one of the rearward link ends in the link assembly are defined further as forming a Y-shape with no cross members interconnecting the connecting members.

12. The spiral conveyor belt of claim 8 wherein the connecting members connecting two of the forward link ends in the first section of each of the link assemblies to one of the rearward link ends in the link assembly are defined further as forming a Y-shape.

13. The spiral conveyor belt of claim 8 wherein the connecting members connecting two of the forward link ends in the first section of each of the link assemblies to one of the rearward link ends in the link assembly are defined further as forming a Y-shape, with no cross members interconnecting the connecting members.

14. A spiral conveyor belt adapted to turn on a radius where the spiral conveyor belt has a first side and a second side and the radius is defined as a distance extending from a point spaced a distance from the first side of the spiral conveyor belt to the first side of the spiral conveyor belt, the spiral conveyor belt comprising:

a plurality of link assemblies, each link assembly having a forward end, a rearward end, a first side and a second side, a plurality of forward link ends being formed on the forward ends of each of the link assemblies with the forward link ends of each link assembly being spaced along the forward end of the link assembly, a forward shaft opening being formed through the forward link ends, a plurality of rearward link ends being formed on the rearward end of each link assembly with the rearward link ends of each link assembly being spaced along the rearward end of the link assembly, a rearward shaft opening being formed through the rearward link ends on each of the link assemblies, the forward end of each link assembly being disposed near the rearward end of another link assembly with the forward shaft openings on each link assembly being aligned with the rearward shaft openings on one of the other link assemblies, the first side of each of the link assemblies cooperating with the first sides of the other link assemblies to form the first side of the spiral conveyor belt and the second side of each of the link assemblies cooperating with the second sides of the other link assemblies to form the second side of the spiral conveyor belt, each link assembly being divided into at least two sections comprising a first section extending from the first side of the link assembly a distance toward the second side of the link assembly, and a second section extending a distance from the first section toward the second side of the link assembly, the forward link ends in the first section being spaced a distance apart and the rearward link ends in the first section being spaced a distance apart, and the forward link ends in the first section being connected to the rearward link ends in the first section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius, each of the link assemblies having a third section extending a distance from the second section to about the second end of each of the link assemblies, the forward link ends in the third section being spaced a distance apart, and the forward link ends in the third section being connected to the rearward link ends in the third section by connecting members whereby the forward link ends and the connecting members connected thereto are collapsible generally toward each other or expandable generally away from each other as the spiral conveyor belt is turned on the radius and whereby the rearward link ends and the connecting members connected thereto are collapsible generally toward each other or expandable generally away from each other as the spiral conveyor belt is turned on the radius; and a plurality of link shafts, each link shaft having a first and a second end, each link shaft having a tapered first section extending a distance from the first end of the link shaft toward the second end of the link shaft and a non-tapered second section extending from the tapered first section a distance toward the second end of the link shaft, the non-tapered second section having a diameter and the tapered first section being tapered to a diameter at the first end of the link shaft which is smaller than the diameter of the non-tapered second section, the forward shaft openings and the rearward shaft openings in each of the link assemblies in the first section being sized to permit the tapered first section of the link shafts to be moved in the forward and rearward shaft openings in the first section of each of the link assemblies as the spiral conveyor belt is moved on the radius, each link shaft having a tapered third section extending a distance from the non-tapered second section to about the second end of the link shafts, the tapered third section being tapered to a diameter at the second end of the link shaft which is smaller than the diameter of the non-tapered second section, the forward shaft openings and the rearward shaft openings in the third section of each of the link assemblies being sized to permit the tapered third section of the link shafts to be moved in the forward and rearward shaft openings in the third section of each of the link assemblies as the spiral conveyor belt is moved on the radius; and wherein the connecting members connecting two of the forward link ends in the first section of each of the link assemblies to one of the rearward link ends in the link assembly form a Y-shape with no cross members interconnecting the connecting members, and wherein the connecting members connecting two of the forward link ends in the third section of each of the link assemblies to one of the rearward link ends in the link assembly form a Y-shape with no cross members interconnecting the connecting members.

* * * * *